United States Patent [19]

Crowe et al.

[11] Patent Number: 4,956,806
[45] Date of Patent: Sep. 11, 1990

[54] METHOD AND APPARATUS FOR EDITING SOURCE FILES OF DIFFERING DATA FORMATS USING AN EDIT TRACKING FILE

[75] Inventors: Andrew S. Crowe, Mountain View; Daniel T. Lai, Fremont, both of Calif.

[73] Assignee: International Business Machines Corporation, Armonk, N.Y.

[21] Appl. No.: 217,996

[22] Filed: Jul. 12, 1988

[51] Int. Cl.$^5$ .............................................. G06F 1/00
[52] U.S. Cl. ................................. 364/900; 364/939; 364/939.2; 364/962; 364/962.4
[58] Field of Search ... 364/200 MS File, 900 MS File, 364/138

[56] References Cited

U.S. PATENT DOCUMENTS

| | | | |
|---|---|---|---|
| 3,084,215 | 4/1953 | Bounsall | 178/6.6 |
| 3,740,125 | 6/1973 | Harris | 352/17 |
| 3,856,387 | 12/1974 | Wray et al. | 352/5 |
| 4,067,049 | 1/1978 | Kelly et al. | 360/14 |
| 4,095,261 | 6/1978 | Rodriguez | 360/13 |
| 4,211,997 | 7/1980 | Rudnick et al. | 371/38 |
| 4,307,859 | 12/1981 | Hayashi et al. | 246/124 |
| 4,322,814 | 3/1982 | Menezes et al. | 364/900 |
| 4,327,382 | 4/1982 | Tanaka | 360/13 |
| 4,352,165 | 9/1982 | Hevenor, Jr. | 364/900 |
| 4,423,441 | 12/1983 | Ozaki et al. | 360/13 |
| 4,434,475 | 2/1984 | McCaskill et al. | 364/900 |
| 4,435,777 | 3/1984 | McCaskill et al. | 364/900 |
| 4,466,029 | 8/1984 | Tanaka | 360/72.2 |
| 4,473,850 | 9/1984 | Foerster et al. | 360/9.1 |
| 4,491,879 | 1/1985 | Fine | 360/14.1 |
| 4,531,161 | 7/1985 | Murakoshi | 360/10.1 |
| 4,580,207 | 4/1986 | Arai et al. | 364/138 |
| 4,591,926 | 5/1986 | Gaskell et al. | 360/13 |
| 4,591,928 | 5/1986 | Bloom et al. | 360/13 |
| 4,618,895 | 10/1986 | Wright | 358/311 |
| 4,641,274 | 2/1987 | Swank | 364/900 |
| 4,658,351 | 4/1987 | Teng | 364/200 |
| 4,682,245 | 7/1987 | Shibata et al. | 358/311 |
| 4,712,180 | 12/1987 | Fujiyama et al. | 364/419 |
| 4,730,348 | 3/1988 | MacCrisken | 375/122 |
| 4,763,252 | 8/1988 | Rose | 364/200 |

OTHER PUBLICATIONS

"A Digital Soung Editor" by Donald Jamieson, Computers and Biomedical Research, pp. 480-487.
"SDS DX7 Voice Editor" by Gerry Queen, Apr. 1985, E&MM, pp. 100-101.
"Editing Audio for Video-and More" by David Neal, International Broadcast Engineering, pp. 13-14.
"Introducing VIPS: A Voice-Interactive Processing System for Document Management" by Alan Biermann, National Computer Conference, 1984, pp. 661-666.
"Digital Audio Editing-2" by John Watkinson, Electronic & Wireless World, Apr. 1986, pp. 52-54.
"Digital Audio Post Production: Sound Editing Transformed" by James Wolvington, SMPTE Journal, Jan. 1987, pp. 34-36.
"Computer Music Interfaces: A Survey" by Bruce Pennycook Computing Surveys, vol. 17, No. 2, Jun. 1985, pp. 267-289.

(List continued on next page.)

*Primary Examiner*—Raulfe B. Zache
*Attorney, Agent, or Firm*—Blakely, Sokoloff, Taylor & Zafman

[57] ABSTRACT

The invention generally relates to improvements in the process and storage of formatted voice, graphic and image data. A new editing process allows the same commands to be applied to a plurality of data files of varying resolution and formats. The technique employs an edit tracking file to retain the edit commands applied to a file of a first format. The edit commands are then executed against a file of a second format to perform the identical editing steps to the second file. This process avoids the inaccuracies associated with converting information to a common format while providing the benefits of supporting multiple formats of file information.

12 Claims, 8 Drawing Sheets

OTHER PUBLICATIONS

"A Dispersion Model for Coupled Microstrips": by Vijai Tripathi IEEE Transactions on Microwave Theory & Techniques, vol. MTT-34, No. 1, Jan. 1986, pp. 66-71.

"The Digital Audio Processing Station: A New Concept in Audio Postproduction" by James A. Moorer, J. Audio Engineering Soc. vol. 34, No. 6, Jun. 1986, pp. 454-463.

"Screen Test" by Paul Wiffen, E&MM Dec. 1985, pp. 44-50.

"Digital Audio Editing" John Watkinson, Electronics & Wireless World, Mar. 1986, pp. 29-32.

"SoundDroid: A New Approach to Digital Editing and Mixing of Sound" by Jeffrey Borish, The BKSTS Journal, 1985, pp. 616-621.

"Audio Storage and Editing System" by Dr. Nick Taylor & John Emmas, International Broadcast Engineering, pp. 44-49.

IBM Technical Disclosure Bulletin, vol. 25, No. 5, Oct. 1984, "Shared Record Validity CheckerControl Unit Extension".

IBM Technical Disclosure Bulletin, vol. 27, No. 10B, Mar. 1985, "Splitting & Merging Objects in a Multiple Data Editor".

IBM Technical Disclosure Bulletin, vol. 28, No. 8, Jan. 1986, "Shadow Application Program".

IBM Technical Disclosure Bulletin, vol. 25, No. 7A, Dec. 1982, "User Interface for Audio Communication System".

IBM Technical Disclosure Bulletin, vol. 14, No. 1, Jun. 1971, "Structure of a Source Program Generator".

IBM Technical Disclosure Bulletin, vol. 16, No. 7, Dec. 1973, "Automatic System Customizer Configurator".

DESIRED PORTION OF TEST1.MU

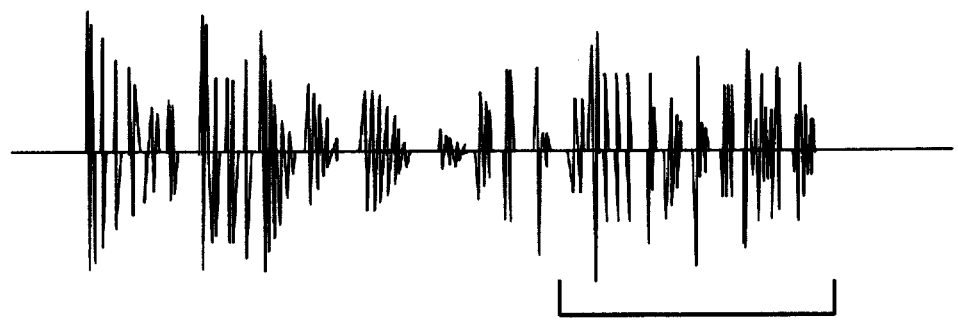
FIG. 8    desired portion of test2.mu
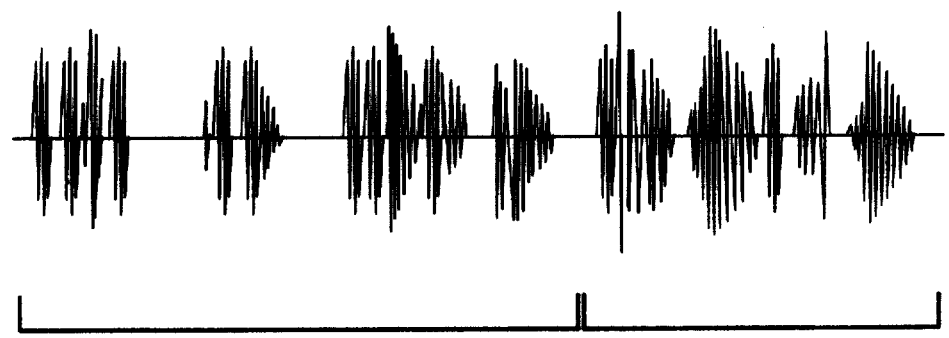
desired portion of test2.mu    desired protion of test1.mu
FIG. 9

METHOD AND APPARATUS FOR EDITING SOURCE FILES OF DIFFERING DATA FORMATS USING AN EDIT TRACKING FILE

BACKGROUND OF THE INVENTION

1. Field of the Invention

This invention generally relates to the process and storage of formatted voice, graphic and image data. An improved editing process allows the same commands to be applied to a plurality of data files of varying resolution and formats.

2. Description Of The Prior Art

The editor plays an important role in the development of computer applications. Early editors allowed programmers to modify source programs a line at a time. These editors were quickly replaced by full page tools that accommodated changes anywhere on the page, thereby increasing user productivity. However, it was not until the advent of the personal computer (PC) that editing tools blossomed into the sophisticated, ergonomic instruments that have resulted in an explosion in programmer productivity.

An example of an editing system that takes advantage of personal computer technology is found in U.S. Pat. No. 4,712,180, to Fujiyama et al., issued Dec. 8, 1987. The patent discloses an education editing system for creating computer assisted training programs. The editing system combines audio information with graphics data and educational prompts to guide students through adventures in learning. The audio editing capabilities employ a cassette tape medium to dub sound information at selective points in the lesson.

Specialized applications for processing voice information have also been developed in response to the demands for special effects in the motion picture industry. An example of soundtrack processing is discussed in U.S. Pat. No. 4,591,928, to Bloom et al., issued May 27, 1986. The patent discloses a soundtrack editor that facilitates the production of a film soundtrack. A feature of the editor is the ability to capture characteristics of a first speech signal and essentially duplicate the characteristics in a second speech signal. The processing includes adjustments to the durations of silence and speech in the second speech signal to synchronize the imbedded first speech signal. Other examples of audio editors include, Moorer, et al., *The Digital Audio Processing Station: A New Concept In Audio Postproduction,* Journal of Audio Eng. Soc., Vol. 34, No. 6, pp. 454–463 (1986) and Taylor, *Audio Storage and Editing System,* International Broadcast Engineer, pp. 44–49 (1987).

A PC based sound editing system is discussed in Wiffen, Paul, *Screen Test (Sound Designer Software),* Electronics and Music Maker, Vol. 5, No. 10, pp. 44–50 (1985). The article critiques a sophisticated sound editing program that combines graphical depictions of sound information with an extensive library of commands for modifying, moving and copying sound files. Sound frequencies can be boosted or attenuated at the user's discretion anywhere locations in the sound file.

While the prior art discusses sophisticated methods for editing and saving sound information, the prior art requires all processed information to be kept in one format. There is no teaching of a method for tracking initial edits of a file in a first format and automatically invoking the same edit commands for processing a file of a second format.

SUMMARY OF THE INVENTION

It is therefore an object of this invention to provide an improved editor for processing a plurality of files of different formats without duplicating the manual editing procedures for each of the plurality of files.

It is a further object of the invention to perform the editing process while conserving the original format of each of the plurality of files.

It is another object of the invention to store and recreate interactive editing sessions.

It is yet another object of the invention to provide an audit trail of the edit procedure.

It is still another object of the invention to provide a method for removing partial edits of a file.

According to the invention, these objects are accomplished by employing an edit tracking file to retain the edit commands applied to a file of a first format. This information is applied to a file of a second format to perform the identical editing steps to the second file without requiring conversion of the second file to a common format and experiencing the associated degradation in file accuracy.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 8 is a graphical representation of another voice file; and

FIG. 9 is a graphical representation of the final edited version of a voice file.

DESCRIPTION OF THE PREFERRED EMBODIMENT OF THE INVENTION

Figure 1:
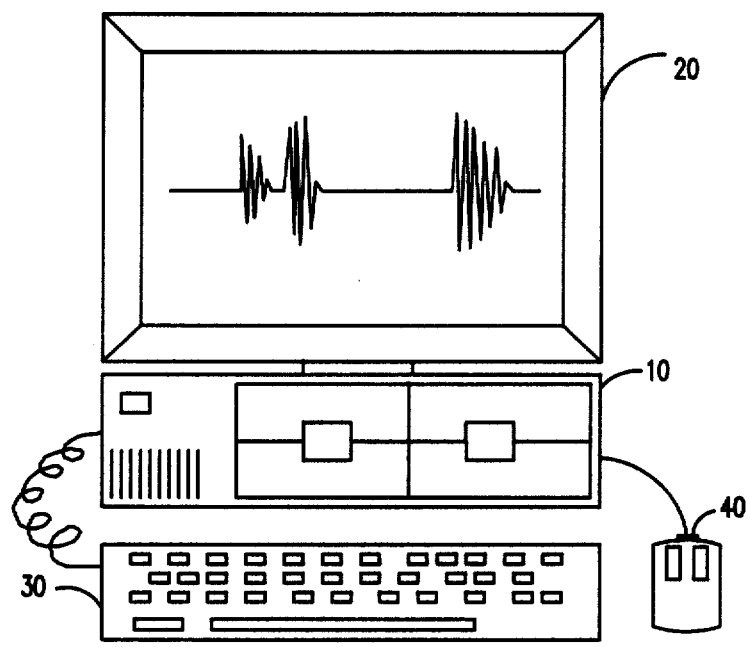
FIG. 1 is an illustration of the hardware environment in accordance with the present invention.

Referring now to the figures, and more particularly to FIG. 1, a block diagram is provided to convey the hardware environment. A personal computer (PC) 10 includes control means for managing a color graphics display 20, a keyboard 30 and a cursor placement device (CPD) 40, such as a mouse or a joystick, for conveying information to the PC 10.

Figure 2:
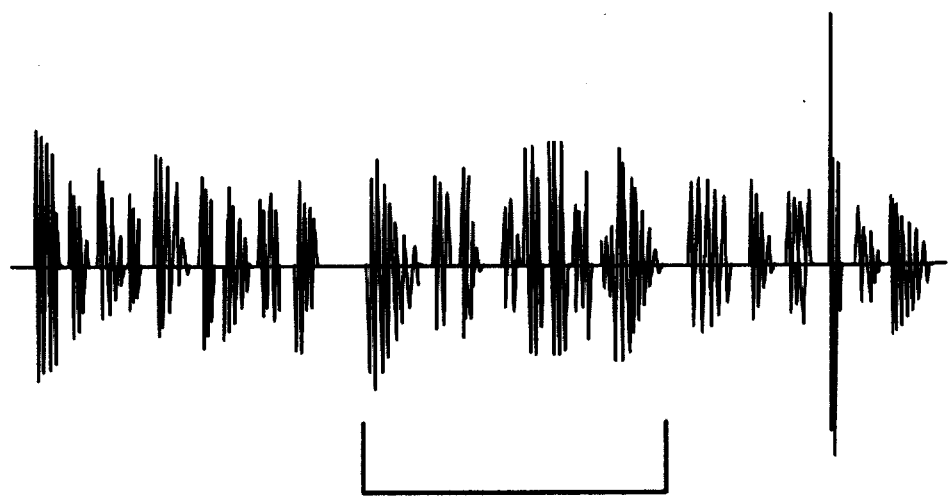
FIG. 2 is a graphical representation of a person's voice.

In this application, the PC 10 is used for storing files of voice data, performing the edit processing, and displaying the voice information in a graphical representation similar to the illustration in FIG. 2. A high level block diagram of the edit processing is provided in FIGS. 3, 4 and 5.

Figure 3:
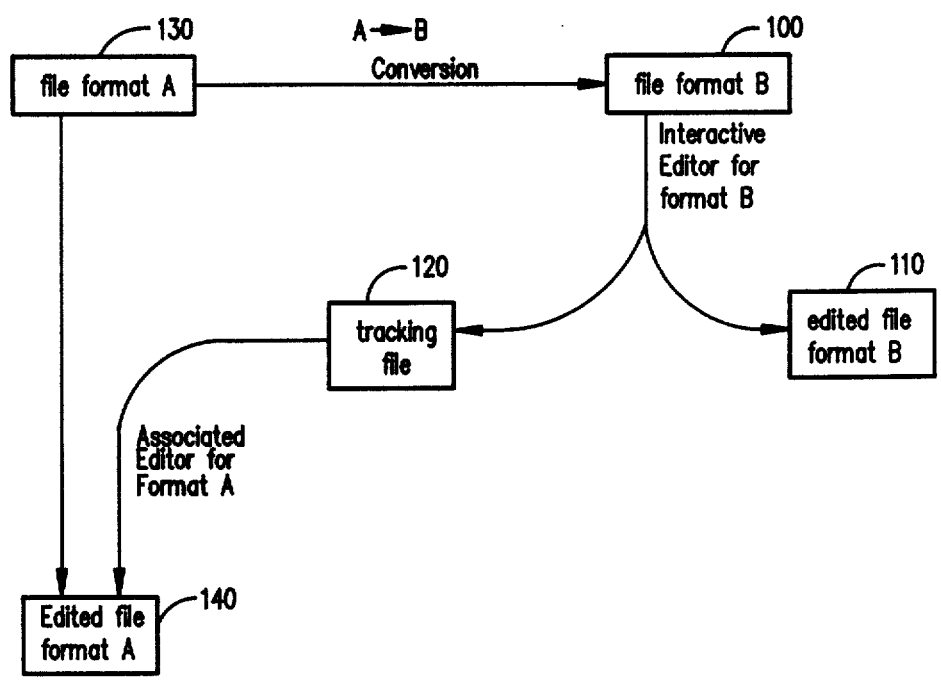
FIG. 3 is a block diagram of the editing process of the present invention.

In FIG. 3, two file formats are similarly edited. First file format B 100 is interactively edited to create an edited version of file format B 110 and a tracking file 120 that contains the information necessary to apply the same edit commands to another file. The tracking file is used to edit file format A 130 to create an identically edited version of file format A 140.

Figure 4:
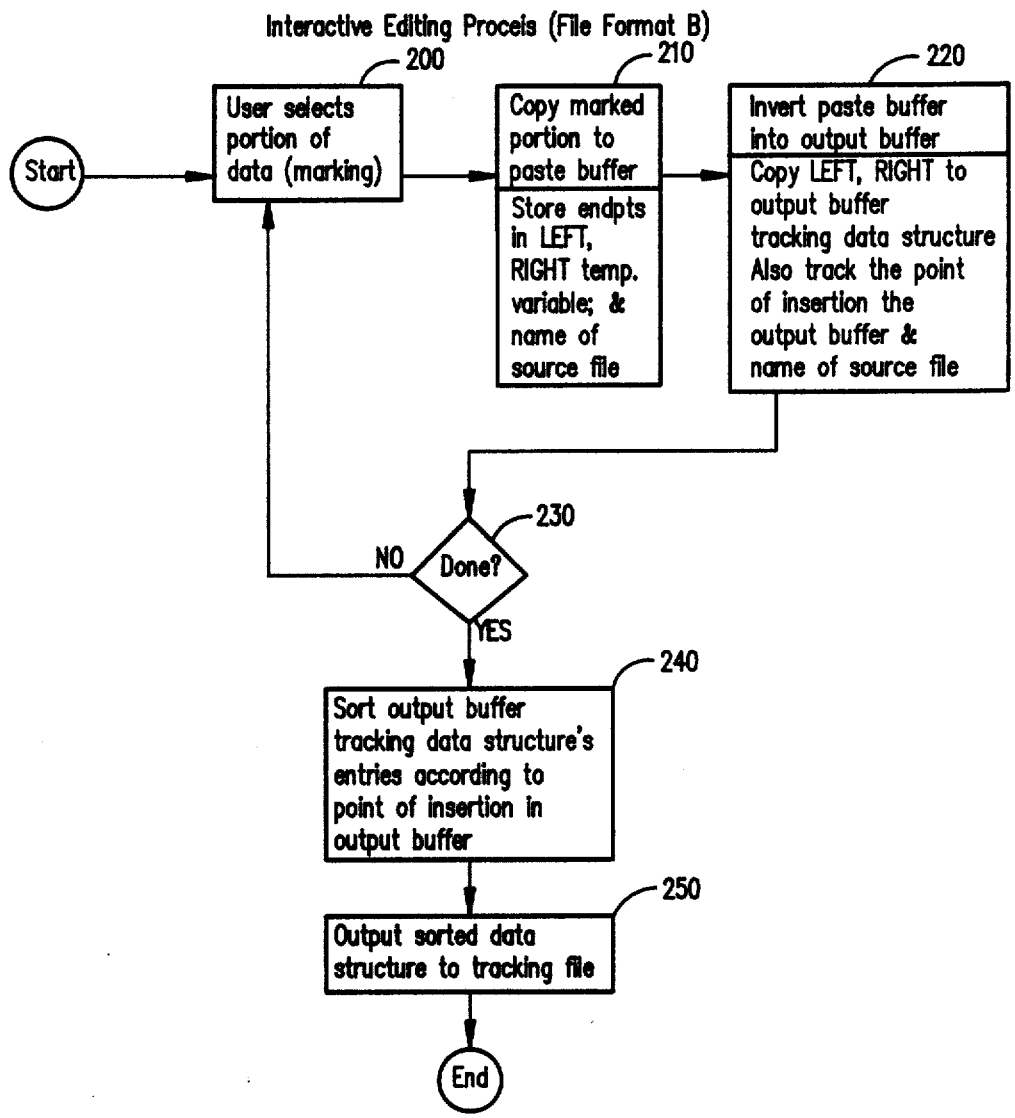
FIG. 4 is an illustration of the interactive editing process of the present invention.

FIG. 4 provides additional details on the interactive edit processing.

The interactive processing begins at function block 200 where the user employs the CPD 40 to select the portion of the data to edit. The user indicates the portion to edit by selecting two corners of a rectangular area. The marked area is then copied to a paste buffer as represented in function block 210. The starting and ending points of the marked area and the name of the source file are also stored as temporary variables in the paste buffer.

Following copying to the paste buffer, the paste buffer itself is copied into the output buffer as described in function block 220. The temporary variables which include the start point, end point and the source file name are copied into the output tracking structure along with the point of insertion in the output buffer A test at decision block 230 determines if editing is completed. If it is not complete, then control is returned to function block 200 to continue editing.

If modifications of the file are complete, then the output buffer tracking file is sorted by entry point location as indicated in function block 240 and the sorted tracking file information is stored in the PC's data storage device as indicated in function block 250. This completes the edit process for file format B.

Figure 5:
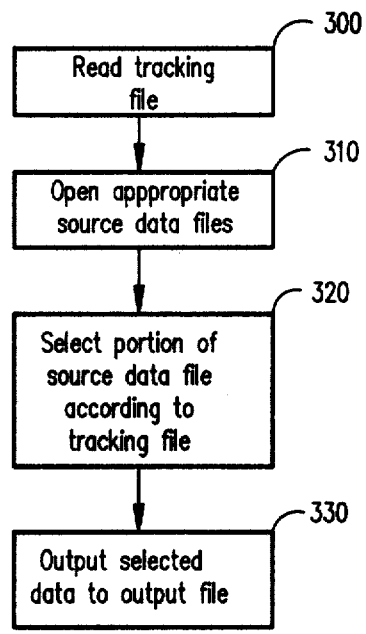
FIG. 5 is a block diagram of the associated editor of the present invention.

FIG. 5 is a block diagram of the edit processing for file format A. Processing begins when the edit tracking file is read in function block 300. Then, the source files that are referenced in the tracking file are opened as shown in function block 310, and selected portions of source data are copied as indicated in function block 320. The portions to copy are specified in the edit tracking file. Finally, the edited version of file format A is written to an output file as disclosed in function block 330. The output of the editing process can be any format specified in the tracking file.

Figure 6:
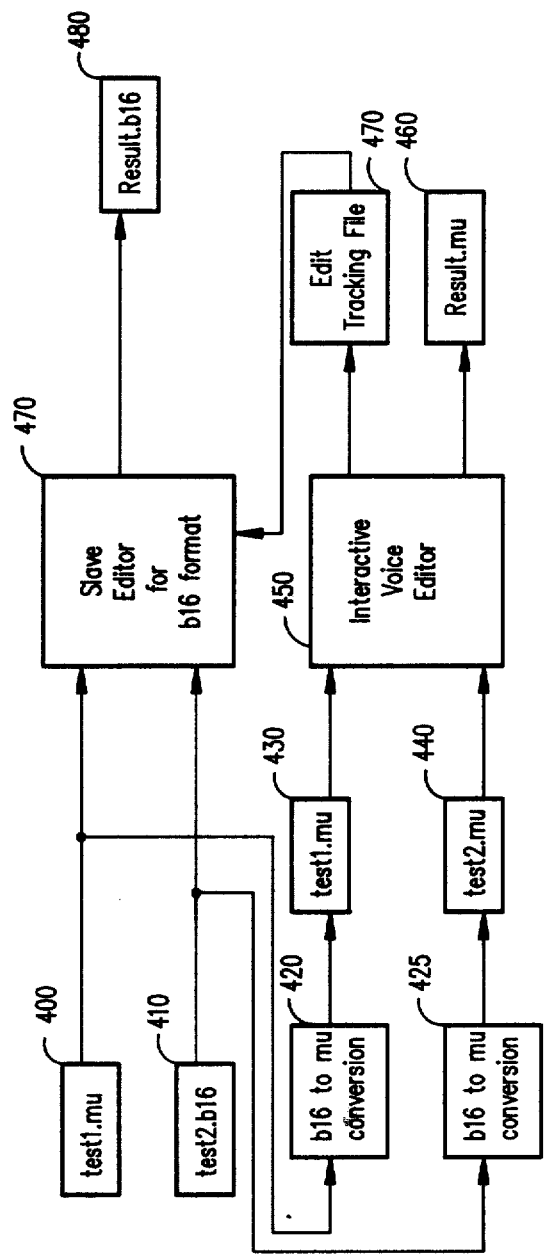
FIG. 6 is a data flow diagram of the edit tracking processing of the present invention.

An example of the edit processing should provide additional clarification. FIG. 6 contains a data flow diagram of the edit tracking processing. Two voice files test1.b16 400 and test2.b16 410, in sixteen bit linear format, are used as input to the processing. The voice editor employs sixty-four Kbps mu-law data and provides an audio representation of the file through a card that plugs into the backplane of the PC 10. The card employs a mu-law codec to process the voice data.

Since the editor can only play mu-law data, the 16-bit linear data must be converted to mu-law format This is accomplished by the editor's convert program at function blocks 420 and 425. The two mu-law files are labeled test1.mu 430 and test2.mu 440. The interactive voice editor 450 processes the converted data test1.mu 430 and test2.mu 440 and creates an edit tracking file 470 of edit commands and a composite of the desired portions of test1.mu 430, test2.mu 440 and result.mu 460.

A slave editor program 470 can now process the original two files test1.b16 400 and test2.b16 410 using the edit tracking file 470 as input to directly edit the two files creating result.b16 480 without the associated conversion distortion associated with result.mu 460.

Figure 7:
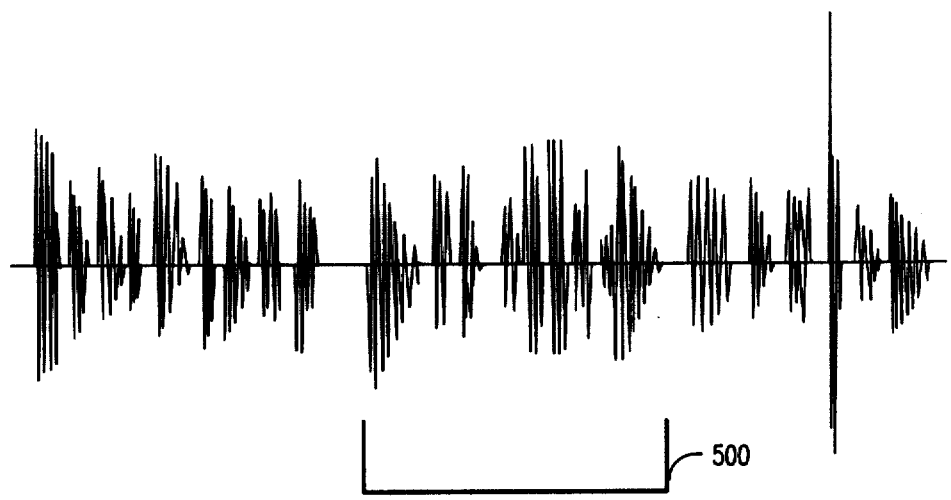
FIG. 7 is a graphical representation of a voice file.

FIG. 7 is a graphical representation of test1.mu 430. The portion of test1.mu 430 that is desired for further processing is bracketed at 500.

FIG. 8 is a graphical representation of test2.mu 440. The portion of test2.mu 440 that is desired for further processing is bracketed at 510. The final edited version of result.mu is shown in FIG. 9. The resultant edit tracking file would have the following format:

| | |
|---|---|
| OUTFILENAME(20) | Array of 21 variable length, character entries; |
| SRCFILENAME(20) | Array of 21 variable length, character entries; |
| LEFT(20) | Array of 21 Left end point addresses; |
| RIGHT(20) | Array of 21 Right end point addresses; |
| NENTRY | Integer number of total entries. |

A source listing of the interactive and slave editors is included below to demonstrate the logic used in implementing an example of the invention. The editors are implemented in "C".

```
/***********************************************
*   A simple associated (slave) editor for editing
*   *.b16 files (format A) according to a tracking
*   file
*   generated by the interactive editor.
*   Inputs:  1) *.b16 data files  -- binary files
*                with 16-bit samples
*            2) tracking file named in the command
*                line
*   Output: *.e16 data files  -- edited *.b16 files
*   Note:   This version restricts each output file
*            to no more than 20 segments of input.
*            Each segment is a piece of input data
*            that was inserted into the output file.
*
```

```
 * Routines:
 * main() -   main routine, calls other routines
 * get_track_info() - reads the tracking file
 * generate_e16()   - generates .e16 file from *
                      .b16 file
 * get_out_file()   - opens correct output file
 * get_fdin()       - opens correct input file
 *
 ******************************************/
#define BAD    -1
#define END     0
#define OK      1
FILE *fp;    /* input tracking file pointer */
char buf[1024];
int ibuf[8192];   /* cut & paste buffer for 8K 16-bit
                     samples */
char out_filename[20]; /* output file name --
                         *.e16 */
char src_filename[21][20]; /* array of source file
                             names */
long left[21];     /* array of left end point sample
                      numbers */
long right[21];    /* array of right end point
sample                       numbers */
int nentry;        /* number of source segments -- #
                      valid entries in
                      src_filename[], left[],
                      right[] */
main (argc, argv)
int argc;
char *argv[];
{
int status;     /* status of get_track_info()
                   routine */
if (argc < 2) {
    printf("Usage: editb16 tracking_file\n");
    exit(-1);
    }
```

```
        /* open tracking file */
        if ((fp = fopen (argv[1], "r")) == NULL)
            {
            printf("cannot open %s\n", argv[1]);
            exit(-1);
            }
        while ((status = get_track_info()) != END)
            {
    /* get info from tracking file to generate
        1 output file.  If end of file, then quit */
            if (status == OK)    /* if info is OK,
                                        generate the
                                        new .e16 file */
                generate_e16();
            }
    }

/*********************************************
 *   This routine reads the tracking file to get a   *
 *   single description which specifies how to
 *   generate one output   *.e16 file.
 *   Input:  Tracking file
 *      The tracking file is read one line at a time.
 *      The lines are parsed to find the name of
 *      output file,
 *      sample number of the left and right
 *      end points, and the source filename of each
 *      segment.
 *   Each entry description has the following format:
 *   line 1:   <* output_file_name xxxxxxxxxxx>;
 *   line 2:   < any comments >;
 *   line 3 to line n:
 *          (upto 20 lines) and each line contains 1
 *            source segment information:
 *   < source_file_name left_endpoint_sample_#
 *     right_endpoint_sample_#>
 *   last line:  <:   >
 *
```

```
*   Output:
*      nentry   -- number of source segments for this
*      .                output file
*          src_filename[]   - array of source file names
*          left[]           - array of left end point
*                              sample numbers
*          right[]          - array of right end point
*                              sample numbers   */
get_track_info()
{
    if (fgets(buf, 256, fp) == NULL)
   /* get one line from the tracking file */
      return(END);
    if (buf[0] != '*') {   /* first line must start
                              with a '*' */
        printf("error: <%s> not starting with
              '*'\n",buf);
        exit(-1);
    }
    sscanf (buf, "%*s %s", out_filename);
     /* get output file name */
    if (fgets(buf,256, fp) == NULL)
     /* skip line 2 -- comments only */
       return(END);
    nentry = 0;    /* no source info yet */
    while (fgets (buf, 256, fp) != NULL) {
           /* get next */
      if (buf[0] == ':')
       /* if start with ':', end of the entry */
          break;
        else if (buf[0] == '*') {
              /* if start with '*', error -- no
                  delimiter ':' between entries */
            printf("list without entry end
                  marker for <%s>\n",
                  out_filename);
              exit(-1);
        } else {
```

```c
                        /* if we get here, read source
                           filename and left,right
                           end points */
    sscanf (buf,"%s %ld   %ld", src_filename[nentry],
            &left[nentry], &right[nentry])
        nentry++;
        /* we just got 1 more source segment
              info */
        if (nentry >= 20) {
            nentry = 20;
            printf("error: more than 20 segments
                    pasted together\n");
            return(BAD);
        }
      }
    }
    return (OK);    /* completed reading 1 entry */
}
/********************************************
 *   routine to cut & paste samples from various
 *   input source files to generate one .e16 output
 *   file
 *   Input:
 *        *.b16 files
 *        nentry  -- number of source segments for
 *        this output file
 *        src_filename[]  - array of source file names
 *        left[]          - array of left end point
 *                          sample numbers
 *        right[]         - array of right end point
 *                          sample numbers
 *   Output:
 *        .e16 output file
 ********************************************/
generate_e16()
{
  int fdin;    /* file descriptor for input source
                  file */
```

```
int fdout;    /* file descriptor for output file */
int i;        /* temp variable */
int n;        /* temp variable */
int ok;       /* temp variable */
long length;  /* temp variable */
int offset;   /* temp variable */
if (get_out_file(&fdout) < 0)
/* get file descriptor of output file */
    return (0);
    for (i=0; i < nentry; i++) {
    /* loop through all source files */
    if ((fdin = get_fdin(i)) > 0) {
    /* open 1 source file */
        lseek (fdin, left[i]+left[i], SEEK_SET);
        /* align pointer correctly */
            length = right[i] - left[i] + 1;
            /* # samples to copy */
            length += length;
            /* # of bytes to copy */
            /* copy "length" bytes from source to
            output file */
            /*                                   */
            /* copy 16K bytes at a time */
            /*                                   */ while (length > 0L) {
      if (length > 16384L)
         n = 16384;
      else
         n = (int) length;
         length -= 16384L;
         if ((ok=read (fdin, ibuf, n)) != n)
         /* read source file */
            printf("premature end of file\n");
         else
            write(fdout, ibuf, n);
            /* write to output file */

}
```

```
                close (fdin);
    /* close this source file */
}
    }
    close (fdout);       /* done -- close output file
*/
}
/*********************************************
 *    routine to open the correct output file
 *
 *    input:
 *        out_filename --  output filename from
 *                         tracking file
 *                         This is the filename used by
 *                         the interactive editor
 *                         and the file was in Format B
 *                         (8-bit samples)
 *                         We have to use a different
 *                         extension for a different
 *                         format -- Format A (16-bit
 *                         samples)
 *    output:
 *        fdout --         file descriptor of proper
 *                         output file (with extension
 *                         *.e16)
 *******************************************/
get_out_file(fdout)
int *fdout;
{
    int len;             /* temp variable */
    char *ptr, *strrchr();
    char filename[20];
    /* name of proper output file */
    int fd;              /* temp file descriptor */
    len = strlen (out_filename);
    out_filename[len] = '\0';
    /* get rid of newline uses out_filename
       to generate a new file */
```

```
    if ((ptr = strrchr (out_filename, '.')) != NULL)
    /* removes .xxx */
        *ptr = '\0';
        sprintf(filename,"%s.e16",out_filename);
    /* generate new output filename make sure the
    interactive  * output is not xxxxxxxx.e16 */
    if (strcmp (filename, out_filename) == 0) {
            printf("error: input and output filenames
                    are the same, so no pasting\n");
            return (-1);      }
        if ((fd = creat (filename, 0x8888)) < 0) {
        /* open output file */
            printf("cannot create %s\n", filename);

return (-1);     }
        *fdout = fd;
        /* return the file descriptor */
        printf("generating %s :\n", filename);
        return (0); }
/*********************************************
 *   routine to open input source file
 *
 *   input :
 *        n   --   index into src_filename[] to get the
 *                 name of input source file
 *
 *   output:
 *        returns the file descriptor
 */
get_fdin (n)
int n;
{
    int fd;
    char srcfile[30];
    char *ptr, *strrchr();
/* src_filename has name of source to interactive
   editor which is in format B (8-bit samples) and
   is different from what we want.  This program is
```

```
            designed to edit xxxxxxxx.b16 file (format A -
            16-bit samples)
*******************************************/
        if ((ptr = strrchr(src_filename[n],'.')) != 0)
        /* removes .xxx extension */
            *ptr = '\0';
            sprintf(srcfile, "%s.b16", src_filename[n]);
            /* generates new filename */
            printf("     processing %s\n", srcfile);
            if ((fd = open (srcfile, 0x8000)) < 0)
            /* open input file */
                printf("cannot open %s\n", srcfile);
                return (fd);
}
#include <stdio.h>
/*********************************************
 *   This file shows the logic that the interactive
 *   editor uses to create and process the tracking
 *   file
 *   Routines:
 *   keep_endpt()   - stores left, right end points
 *                    and source filename
 *   keep_bufnum()  - stores temporary data into the
 *                    tracking data structure
 *   write_endpt()  - sorts and writes tracking
 *                    information to the tracking file
 ******************************************/
#define LEFT    0
#define RIGHT   1
#define BEGIN   0
#define END     1
static long paste_leftend;
/*temp variable for left end point */
static long paste_rightend;
/* temp variable for right end point */
static char paste_src_filename[20];
/* temp variable for source filename */
/* data structure definition for tracking insert
    from paste buffer */
```

```c
typedef struct flistobj {
    long left;   /* left end point sample # */
    long right;  /* right end point sample # */
    int where;   /* BEGIN or END -- insert to
                    beginning or end */
    char srcfile[20]; /* name of source file */
} filelist;
/* space for 20 output buffers, 20 segments each */
static filelist flist[20][20];
static int flist_nentry[20];
/* keep track of # of segments for each buffer */
/*******************************************
 *  This routine stores the left and right end
 *  points and the source filenames into temp
 *  variables.  This routine is called every time we
 *  copy the marked portion into the paste buffer.
 *******************************************/
keep_endpt(left,right,fname)
long left;
/* left end point sample # of marked data */
long right;
/* right end point sample # of marked data */
char *fname;
/* source filename of the marked data */
{
    paste_leftend = left;
    paste_rightend = right;
    strcpy(paste_src_filename, fname);
}
/***********************************************
 *  Routine to track paste buffer insertion into an
 *  output buffer.  The routine puts paste buffer
 *  temp variables into the data structure for later
 *  storage in the edit
 *  tracking file.
 *
 *  This routine is called every time a paste buffer
 *  is inserted into an output buffer.
```

```
keep_bufnum(bufnum, where)
int bufnum;   /* output buffer number */
int where;
/* paste buffer inserted into beginning or end of
output buffer */
{
    int n;
    /* just a temp variable */
    if (paste_leftend == paste_rightend)
    /* if paste buffer is empty, then */
        return (0);
        n = flist_nentry[bufnum];
        /* copy temp variables into tracking data
           structure */
        flist[bufnum][n].left = paste_leftend;
        flist[bufnum][n].right = paste_rightend;
        flist[bufnum][n].where = where;
        strcpy(flist[bufnum][n].srcfile,
              paste_src_filename);
        flist_nentry[bufnum]++;
        /* we just added an entry */
}
/***************************************************
 *  Routine to update tracking file according to
 *  tracking data structure.  Before writing the
 *  data structure to the tracking file, the entries
 *  associated with the buffer are sorted according
 *  to how the various entries were inserted into
 *  the buffer.
 *  This routine is called whenever an output buffer
 *  is written to an output file.
 *
 ***************************************************/
write_endpt (fname, buf_idx)
char *fname;          /* output filename */
int buf_idx;          /* buffer number */
{
```

```c
FILE *fp;          /* file pointer for tracking
                        file */
int n;
/* # of entries for this buffer */
int i, j;          /* just temp variables */
int high, low;
/* variables used in sorting entries */
int order[20];
/* variable used in sorting entries */
int real_order[20];
/* variable used in sorting entries */
n = flist_nentry[buf_idx];
/* # of entries for this buffer */
if (n < 1)
/* make sure this buffer is not empty */
    return (0);
 /* open the tracking file */
 fp = fopen ("filelist.abc", "a");
 /* open for append only */
 /* first line of the new output */
 fprintf(fp,"* %s generated from pasting
        together :\n",fname);
/* sort the entries according to how they were
inserted into the buffer */
high = 0;
low = 0;
for (i=0; i < n; i++) {
   if (flist[buf_idx][i].where == BEGIN) {
       order[i] = low;
       low--;
    } else {
        high++;
        order[i] = high;
    }
 }
 low++;
 for (i=low; i <= high; i++) {
     for (j=0; j < n; j++) {
```

```
            if (order[j] == i)
                break;
        }
        real_order[i-low] = j;
    }
/*******************************************/
/* generates one line per sorted entry */
    fprintf(fp, "         filename     leftend
            rightend\n");
    for (i=0; i < n; i++) {
        j = real_order[i];
        fprintf(fp, "%20s  %8ld  %8ld\n",
                flist[buf_idx][j].srcfile,
                flist[buf_idx][j].left,
                flist[buf_idx][j].right);
    }
    fprintf(fp, ":\n");        /* end of this record */
    fclose (fp);               /* close the file */
}
```

TRACKING FILE

Throughout the application, there are numerous references to the tracking file. Thus, it is appropriate to provide functional and logic information concerning additional characteristics of the tracking file. The tracking file contains information about processing steps other than marking and editing, such as filtering and scaling. The filters are generally implemented as finite impulse response (FIR) filters or infinite impulse response (IIR) filters of various, arbitrary shapes. To keep track of the filters and their application, the tracking file contains the input file name, start and end sample numbers, and the coefficients used in the filter.

The coefficients of a FIR filter determine the filter's shape. Scaling factors are also stored in the tracking file. Their purpose is to vary a signal by a predetermined constant. Scaling is performed by multiplying the signal amplitude by a constant scale factor. The tracking file's input file name, start sample number and end sample numbers are augmented by a scale factor.

A software ("C") implementation of a FIR filter, an IIR filter and a scaling algorithm are provided below to clarify the operation of a software implemented filter.

```
/******************************************************
*   FIR_FILTER:
*       (Standard finite impulse response filter)
*       y[i]=Sum over k (coef[k]*x[i-k]), k=0, ntap-1
*       Input:  x[]        -- input sample array
*               coef[]     -- filter coefficient array
*               oldx[]     -- old sample array of input
*               nsample    -- number of samples in x[]
*               ntap       -- number of coefficients in
*                             coef[]
*       Output: y[]        -- output is an array with
```

```
*                           nsamples members.
*       Example:
*           Let ntap = 3 and nsample = 6
*             y[0] = c[0]*oldx[0] + c[1]*oldx[1] +
*                    c[2]*x[0]
*             y[1] = c[0]*oldx[1] + c[1]*x[0]     +
*                    c[2]*x[1]
*             y[2] = c[0]*x[0]    + c[1]*x[1]     +
*                    c[2]*x[2]
*             y[3] = c[0]*x[1]    + c[1]*x[2]     +
*                    c[2]*x[3]
*             y[4] = c[0]*x[2]    + c[1]*x[3]     +
*                    c[2]*x[4]
*             y[5] = c[0]*x[3]    + c[1]*x[4]     +
*                    c[2]*x[5]
*          oldx[0] = x[4]
*          oldx[1] = x[5]
******************************************/ fir_filter(x, coef, oldx, y, nsample, ntap)
 double x[];
 double coef[];
 double oldx[];
 double y[];
 int nsample;
 int ntap;
 {
    int i;
    int tap;
    /* first ntap-1 output samples have to use some
       old input samples */
    for (i=0; i < ntap-1; i++)
    {
        y[i] = 0;
        for (tap=0; tap < ntap-i-1; tap++)
           y[i] = y[i] + coef[tap]*oldx[tap+i];
        for (tap = ntap-i-1; tap < ntap; tap++)
           y[i] = y[i] + coef[tap]*x[i+tap-ntap+1];
```

```
        }
/* The rest of the nsamples.  Do more old input
    sample */
        for (i=ntap-1; i < nsample; i++)
        {
            y[i] = 0;
            for (tap=0; tap < ntap; tap++)
                y[i] = y[i] +
                coef[tap]*x[i+tap-ntap+1];
        }
        /* save the old samples */
        for (tap=0; tap < ntap-1; tap++)
            oldx[tap] = x[tap+nsample-ntap+1];
}
/*******************************************************
*
*   Routine:    Biquad
*   Routine to implement a bi-quad section of an
*   Infinite Impulse Response (IIR) filter.
*       Each Bi-quad section:
*
*                          -1        -2
*                 1 + a1 * z   + a2 * z
*       H(z)  =  ---------------------------
*                          -1        -2
*                 1 + b1 * z   + b2 * z
*       y[i] = x[i] + a1*x[i-1] + a2*x[i-2] -
*              b1*y[i-1] - b2*y[i-2]
*       This routine implements the direct form II
*       for an IIR filter.
*
*******************************************/
biquad(x,zold,y,a,b,nsample)
double x[];        /* input samples array */
double zold[];     /* old intermediate result array */
double y[];        /* output array */
double a[];        /* coefficients for zeros of
                      transfer fcn, a[0]=a1, a[1]=a2 */
double b[];        /* coefficients for poles of
```

```
                    transfer fcn, b[0]=b1, b[1]=b2 */
int nsample;      /* number of samples in x[] */
{
int i;
double ztmp;
for (i=0; i < nsample; i++)
    {
        ztmp = x[i];
        ztmp -= b[0] * zold[0];
        ztmp -= b[1] * zold[1];
        y[i] = ztmp;
        y[i] += a[0] * zold[0];
        y[i] += a[1] * zold[1];
        zold[1] = zold[0];
        zold[0] = ztmp;
    }
}
/**********************************************
* Routine:  Scale
*       Scales signal amplitude by a predetermined
*       constant value.
*
**********************************************/
scale(x,nsample,scale_factor)
double x[];              /* signal array */
int nsample;             /* number of samples in
                                x[] */
double scale_factor;     /* scale_factor */
{
int i;
for (i=0; i < nsample; i++)
        x[i] = x[i] * scale_factor;
}
/**********************************************/
```

While the invention has been described in terms of a preferred embodiment in a specific environment, those skilled in the art will recognize that the invention can be practiced, with modification, in other and different environments within the spirit and scope of the appended claims.

Having thus described our invention, what we claim as new and desire to secure by Letters Patent is set forth in the following claims:

1. A method for editing source files containing audio information of differing data formats on a display using a plurality of edit commands, comprising the steps of:
   (a) performing one of said plurality of edit commands on a source file containing audio information of a first data format;
   (b) copying said performed edit command in a buffer;
   (c) writing said edit command from said buffer to a tracking file; and
   (d) repeating steps (a)–(c) for each of said plurality of edit commands;
   (e) reading each of said written edit commands from said tracking file and replaying said read edit commands against at least one source file containing audio information having a second data format thereby effecting commensurate changes to the at least one source file having the second data format and creating an edit file corresponding to said source file having the first data format.

2. A method for editing a source file containing audio information of a first data format on a display as recited in claim 1, wherein the performing step comprises the the steps of:
   (a) prompting a user to indicate a first point of an area of interest on the display to include in the edited file;
   (b) responding to the pressing of a first key or movement of a cursor placement device to indicate a second point of the area of interest on the display;
   (c) drawing a translucent rectangle on the display specified by the first point and the second point;
   (d) repeating steps (b) and (c) until the area of interest is enclosed by the translucent rectangle on the display; and
   (e) responding to the pressing of a second key to store the first point, the second point and the name of the source file having said first data format in a memory.

3. A method for editing a source file containing audio information on a display as recited in claim 2, wherein the performing step further comprises the step of filtering the area of interest.

4. A method for editing a source file containing audio information on a display as recited in claim 2, wherein the performing step further comprises the step of scaling the area of interest.

5. A method for editing a source file containing audio information on a display as recited in claim 2, wherein the tracking file is on a data storage device.

6. A method for editing a source file containing audio information of a first data format on a display as recited in claim 5, wherein the reading step comprises the steps of:
   (a) reading a record from the tracking file on said data storage device;
   (b) parsing the read record into a name of a source file, a first point and a second point;
   (c) reading the source file using the read name;
   (d) obtaining the area of interest from the read source file based on the first point and the second point;
   (e) reading the source file having the second data format and applying the obtained area of interest thereto;
   (f) writing the applied area
   (g) repeating steps (a), (b), (c), (d) and (e) until all of the records from the tracking file have been processed.

7. A computer program for editing source files containing audio information of differing data formats on a display using a plurality of edit commands, comprising:
   (a) means for performing each of said plurality of edit commands on a source file containing audio information of a first data format;
   (b) means for copying each of said performed edit commands in a buffer;
   (c) means for writing said edit commands from said buffer to a tracking file; and
   (d) means for reading each of said written edit commands from said tracking file and replaying each of said edit commands against at least one source file containing audio information of a second data format thereby effecting commensurate changes to the source file having the first data format.

8. A computer program for editing a source file containing audio information of a first data format on a display as recited in claim 10, further comprising:
   (a) means for prompting a user to indicate a first point of an area of interest on the display to include in the edited file;
   (b) means for responding to the pressing of a first key or movement of a cursor placement device to indicate a second point of the area of interest on the display;
   (c) means for drawing a translucent rectangle on the display specified by the first point and the second point;
   (d) means for responding to the pressing of a second key to store the first point, the second point and the name of the source file of said first data format in a memory.

9. A computer program for editing a source file containing audio information on a display as recited in claim 8, further comprising means for filtering the area of interest.

10. A computer program for editing a source file containing audio information on a display as recited in claim 8, further comprising, means for scaling the area of interest.

11. A computer program for editing a source file containing audio information on a display as recited in claim 8, wherein the tracking file is on a data storage device.

12. A computer program for editing a source file containing audio information of a first data format on a display as recited in claim 11, wherein said reading means comprises:
   (a) means for reading a record from the tracking file on the data storage device;
   (b) means for parsing the read record into a name of a source file, a first point and a second point;

(c) means for reading the source file using the read name;
(d) means for obtaining area of interest from the read source file based on the first point and the second point;
(e) means for reading the source file having the second data format and applying the obtained area of interest thereto;
(f) means for writing area of interest into an output file.

* * * * *

UNITED STATES PATENT AND TRADEMARK OFFICE
CERTIFICATE OF CORRECTION

PATENT NO. : 4,956,806
DATED : 9/11/90
INVENTOR(S) : Crowe et al.

It is certified that error in the above-identified patent and that said Letters Patent is hereby corrected as shown below:

col. 36, line 36    delete "claim 10"    insert --claim 7--

Signed and Sealed this

Third Day of November, 1992

*Attest:*

DOUGLAS B. COMER

*Attesting Officer*    *Acting Commissioner of Patents and Trademarks*